(12) United States Patent
Sharpe

(10) Patent No.: US 11,565,798 B2
(45) Date of Patent: *Jan. 31, 2023

(54) CENTER BIASED ACTUATOR

(71) Applicant: SAFRAN LANDING SYSTEMS UK LTD, Gloucester (GB)

(72) Inventor: Peter Sharpe, Gloucester (GB)

(73) Assignee: Safran Landing Systems UK LTD

( * ) Notice: Subject to any disclaimer, the term of this patent is extended or adjusted under 35 U.S.C. 154(b) by 37 days.

This patent is subject to a terminal disclaimer.

(21) Appl. No.: 17/322,053

(22) Filed: May 17, 2021

(65) Prior Publication Data

US 2021/0269147 A1    Sep. 2, 2021

Related U.S. Application Data

(63) Continuation of application No. 16/189,073, filed on Nov. 13, 2018, now Pat. No. 11,027,830.

(30) Foreign Application Priority Data

Nov. 16, 2017    (EP) ..................................... 17202153

(51) Int. Cl.
*B64C 25/00*    (2006.01)
*B64C 25/62*    (2006.01)
(Continued)

(52) U.S. Cl.
CPC .............. *B64C 25/62* (2013.01); *B64C 25/34* (2013.01); *B64C 25/60* (2013.01); *F15B 1/103* (2013.01);
(Continued)

(58) Field of Classification Search
CPC .. B64C 25/60; B64C 25/34; F16F 9/06; F16F 9/08; F16F 9/48
See application file for complete search history.

(56) References Cited

U.S. PATENT DOCUMENTS 6,182,925 B1 * 2/2001 Kilner ................... F15B 11/123
244/102 SL
8,201,582 B2    6/2012 Stroganov et al.
(Continued)

FOREIGN PATENT DOCUMENTS

CN    201916278 U    8/2011
CN    102177349 A    9/2011
(Continued)

OTHER PUBLICATIONS

Chinese Office Action for Chinese Application No. 201811306180. 0, dated Nov. 26, 2021, with English translation, 17 pages.
(Continued)

*Primary Examiner* — Tye William Abell
(74) *Attorney, Agent, or Firm* — RatnerPrestia

(57) ABSTRACT

A center biased actuator having an outer cylinder, a slave cylinder linearly transposed within the outer cylinder, a rod assembly with a piston linearly transposed within the slave cylinder and a rod extending from the outer cylinder, one or more first dynamic seals arranged to act on a sidewall of the rod to inhibit hydraulic fluid leaking from the outer cylinder, one or more second dynamic seals arranged to act on a sidewall of the slave cylinder or an inner surface of the outer cylinder to inhibit hydraulic fluid leaking from the outer cylinder, and a gas chamber comprising a sealed expandable chamber containing gas. The expandable chamber is arranged to act on hydraulic fluid within the center biased actuator to bias the center biased actuator to assume an intermediate condition which lies between a compressed condition and an extended condition.

17 Claims, 6 Drawing Sheets

(51) Int. Cl.
  *B64C 25/60* (2006.01)
  *F15B 11/12* (2006.01)
  *F16F 9/088* (2006.01)
  *F15B 1/10* (2006.01)
  *B64C 25/34* (2006.01)
  *F16F 9/52* (2006.01)
  *F16F 9/06* (2006.01)

(52) U.S. Cl.
  CPC ............ *F15B 11/123* (2013.01); *F16F 9/088* (2013.01); *B64C 2025/008* (2013.01); *F15B 2201/205* (2013.01); *F15B 2201/3153* (2013.01); *F16F 9/063* (2013.01); *F16F 9/526* (2013.01)

(56) References Cited

U.S. PATENT DOCUMENTS

2016/0076561 A1* 3/2016 Green ................ F15B 15/1438
  92/143
2019/0016447 A1* 1/2019 Luce .................... F16F 13/007

FOREIGN PATENT DOCUMENTS

| CN | 103252702 A | | 8/2013 | |
|----|----|----|----|----|
| CN | 113565838 A | | 10/2021 | |
| EP | 1041001 A2 | | 10/2000 | |
| GB | 581417 | | 10/1946 | |
| GB | 603363 | | 6/1948 | |
| GB | 868980 | | 5/1961 | |
| GB | 1325137 | | 8/1973 | |
| GB | 2057629 A | * | 4/1981 | ............. B64C 25/60 |
| GB | 2057629 A | | 4/1981 | |
| GB | 2510208 A | | 7/2014 | |

OTHER PUBLICATIONS

Extended European Search Report for European Application No. 17 202 153.7, dated Jun. 1, 2018—8 pages.

Entire patent prosecution history of U.S. Appl. No. 16/189,073, filed Nov. 13, 2018, entitled "Center Biased Acutuator," now U.S. Pat. No. 11,027,830, issued Jun. 8, 2021.

* cited by examiner

CENTER BIASED ACTUATOR

This application is a continuation of U.S. application Ser. No. 16/189,073, filed on Nov. 13, 2018, which claims the benefit of and priority to European Application No. 17202153.7, filed on Nov. 16, 2017, both of which are incorporated herein by reference.

BACKGROUND

A known class of actuator is arranged so as to be biased to assume an intermediate condition which lies between a compressed condition and an extended condition in terms of the extension state of the actuator. Such actuators will be referred to herein as "center biased."

A center biased actuator can be used to bias a first part of an assembly to move to a predetermined position relative to a second part of the assembly and oppose relative movement from the predetermined position. Once such example is an aircraft landing gear 'pitch trimmer' actuator, also alternatively known as a 'truck positioner' which is arranged to bias a bogie beam to adopt a predetermined orientation relative to a main strut, such as orientating it for stowage following take-off.

A center biased actuator contains pressurized fluid which acts on internal surfaces of the actuator such that a pressure differential causes the actuator to adopt the intermediate condition. A center biased actuator will therefore oppose an applied force which acts to move the actuator from the intermediate condition.

The pressurized fluid can be provided by an external supply, such as a vehicle hydraulic supply. Alternatively, a center biased actuator can be self-contained, where the working fluid comprises a virtually incompressible liquid and a compressible gas, the liquid being pressurized by the stored energy in the compressed gas.

The present inventor has identified that known self-contained center biased actuators can be improved to reduce the likelihood of loss of bias force towards the intermediate condition. The present inventor has also identified that known self-contained center biased actuators can be improved to simplify actuator maintenance and/or monitoring.

This description of the background is provided to assist with an understanding of the following explanations of exemplary embodiments, and is not an admission that any or all of this background information is necessarily prior art.

SUMMARY

According to a first aspect of the invention, there is provided a center biased actuator having an outer cylinder, a slave cylinder arranged to be linearly transposed within the outer cylinder, a rod assembly, the piston of which is arranged to be linearly transposed within the slave cylinder and the rod of which extends from the outer cylinder, one or more first dynamic seals arranged to act on a sidewall of the rod to inhibit hydraulic fluid leaking from the outer cylinder, one or more second dynamic seals arranged to act on a sidewall of the slave cylinder or an inner surface of the outer cylinder to inhibit hydraulic fluid leaking from the outer cylinder, and a gas chamber having a sealed expandable chamber containing gas. The expandable chamber is arranged to act on hydraulic fluid within the center biased actuator to bias the center biased actuator to assume an intermediate condition which lies between a compressed condition and an extended condition.

Thus, a center biased actuator according to the first aspect of the invention has a sealed gas chamber defined by an elastic vessel or expandable chamber, the volume of which can vary in an elastic nature. The gas within the expandable chamber can expand to accommodate the loss of hydraulic fluid across dynamic seals while inhibiting both transfer of hydraulic fluid to the gas chamber and transfer of gas from the gas chamber into hydraulic fluid within the actuator. This can reduce the likelihood of the actuator's center biased properties degrading in use, while also making it easier to maintain and monitor operational properties of the actuator due to the removal of any need to monitor liquid or gas transfer between the gas chamber and hydraulic fluid chamber.

The center biased actuator can be an oleo-pneumatic actuator or shock absorber.

The expandable chamber can comprise metal bellows. The present inventor has found that metal bellows can provide a particularly reliable expandable chamber for a self-contained center biased actuator such as an aircraft landing gear pitch trimmer.

The expandable chamber can be mounted within an accumulator cylinder that is coupled to a hydraulic fluid port through the outer cylinder.

The rod assembly can include a blind hole which opens into and is in fluid communication with an internal chamber of the slave cylinder. The expandable chamber can be mounted within the blind hole.

The outer cylinder can have a length and the one or more second dynamic seals can be located closer to the middle of the outer cylinder than to either end of it.

The outer cylinder can incorporate at least one gland housing dynamic rod seal, or a sliding surface for an internal piston seal.

The outer cylinder can comprise a first axial face and a second axial face connected by one or more first sidewalls to define a primary chamber, the first axial face having a first through-hole. Thus, the outer cylinder may define an inner volume within which a slave cylinder is linearly transposed so as to be movable relative to the outer cylinder.

The slave cylinder can be linearly transposed within the primary chamber, the slave cylinder comprising a third axial face and a fourth axial face connected by one or more second sidewalls to define a slave cylinder chamber, the third axial face having a second through-hole, the slave cylinder being constrained to move only between first and second extremities within the primary chamber so as to leave at least one free portion of the primary chamber, the outer cylinder including a venting port in fluid communication with the free portion of the primary chamber.

The piston of the piston and rod assembly can be linearly transposed within the slave cylinder chamber and the rod of which can extend through the second and first through-holes so as to project a free end from the outer cylinder.

The one or more first dynamic seals can be mounted at or adjacent to the first through hole and arranged to act on an external surface of the rod to inhibit working fluid within the chamber passing through the first through-hole. The one or more second dynamic seals can be mounted on the one or more first sidewalls of the outer cylinder and arranged to act on an external surface of the one or more second sidewalls of the slave cylinder to inhibit working fluid within the chamber passing to the free portion of the primary chamber.

The actuator can be arranged to be movable between an extended condition and a compressed condition and being biased to an intermediate condition between and distinct from the extended condition and the compressed condition.

In embodiments of the invention the intermediate condition may be anywhere between but distinct from the extended and compressed conditions. In some embodiments the intermediate condition may be generally mid-way between the extended and compressed conditions. The actuator may be biased towards the intermediate condition from both contracted and extended conditions.

Thus, according to an aspect of the invention, there is provided a center biased actuator arranged to be movable between an extended condition and a compressed condition and being biased to an intermediate condition between and distinct from the extended condition and the compressed condition. The actuator includes an outer cylinder having a first axial face and a second axial face connected by one or more first sidewalls to define a primary chamber, the first axial face having a first through-hole. A slave cylinder is linearly transposed within the primary chamber, the slave cylinder having a third axial face and a fourth axial face connected by one or more second sidewalls to define a slave cylinder chamber, the third axial face having a second through-hole. The slave cylinder is constrained to move between first and second extremities within the primary chamber so as to leave at least one free portion of the primary chamber. The outer cylinder includes a venting port in fluid communication with the free portion of the primary chamber. A rod assembly has a piston linearly transposed within the slave cylinder chamber and a rod that extends through the second and first through-holes so as to project a free end from the outer cylinder. One or more first dynamic seals act on a sidewall of the rod to inhibit hydraulic fluid leaking from the outer cylinder. One or more second dynamic seals act on a sidewall of the slave cylinder or an inner surface of the outer cylinder to inhibit hydraulic fluid leaking from the outer cylinder. A gas chamber having a sealed expandable chamber containing gas is arranged to act on hydraulic fluid within the center biased actuator to bias the center biased actuator to assume an intermediate condition which lies between a compressed condition and an extended condition.

The actuator can be provided with end stops arranged to define the first and second movement extremities of the slave cylinder. The end stops can comprise abutment formations or snubbing valves.

The actuator can be arranged such that the venting port is in fluid communication with the free portion of the chamber while the slave cylinder moves between the first and second extremities. This can for example be achieved by locating the end stops such that the slave cylinder cannot move to a position in which it seals the venting port, and in some embodiments a pressurization port. Alternatively, one or more relief channels can be provided to provide fluid communication even when the slave cylinder is parallel with the port.

According to a further aspect of the invention there is provided an assembly including an actuator according to the first aspect arranged to bias a first part of the assembly to assume a predetermined position relative to the second part, the assembly being arranged, in use, to force the actuator to assume the first condition when in a first state and having a second state in which the actuator moves the first part of the assembly to assume the predetermined position relative to the second part.

The assembly may be an aircraft assembly, such as an aircraft landing gear assembly.

The first part may be a bogie beam. The second part may be a main strut, such as main fitting or a sliding tube of a shock absorbing strut.

BRIEF DESCRIPTION OF THE DRAWINGS

Embodiments of the invention will now be described with reference to the accompanying drawings, in which.

DESCRIPTION OF EXEMPLARY EMBODIMENTS

Figure 1:
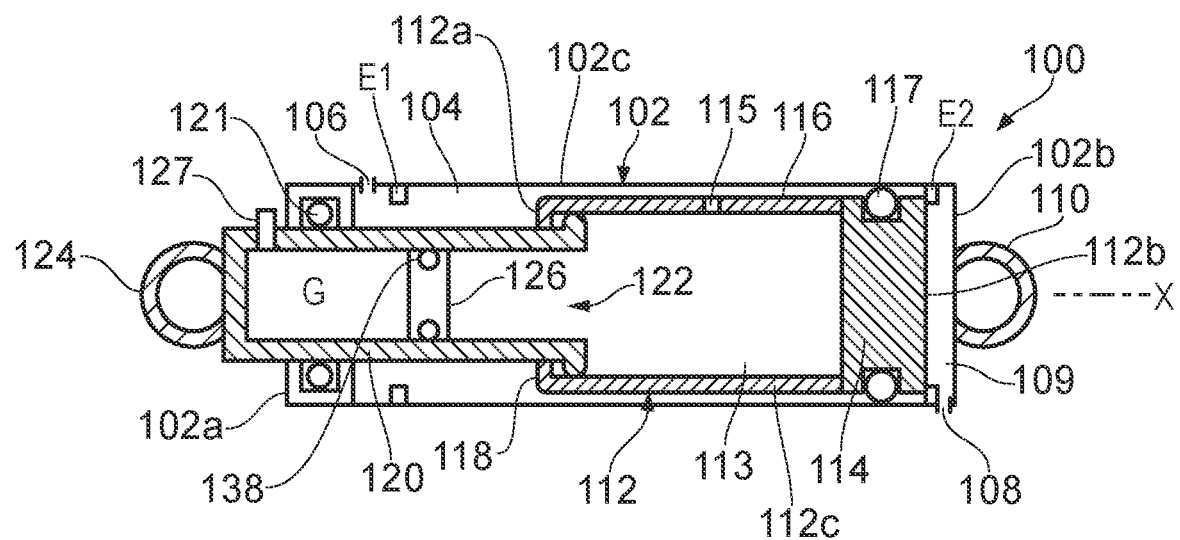
FIG. 1 is a diagram of a prior art actuator.

FIG. 1 is a longitudinal cross section view of a known center biased actuator 100. The actuator 100 is a "single acting" actuator i.e. when displaced from the bias position it is then mechanically biased to move under its own internal fluid pressure to assume an intermediate condition, but is not arranged to be actuated to compressed or extended conditions without external force, as it must be driven to the compressed or extended positions by an external load.

The actuator 100 includes an outer cylinder 102 defining an inner volume that is generally partitioned by a slave cylinder 112 into a passive gas chamber 109 and a primary chamber 104 for containing hydraulic or working fluid. The outer cylinder 102 has a first axial face 102a and a second axial face 102b connected by one or more first sidewalls 102c to define the primary chamber 104. The first axial face 102a has a first through-hole. The outer cylinder 102 defines a first coupling region 110.

The gas chamber 109 is vented to atmosphere via a venting port 108, which can be formed in the second axial face 102b or the first sidewalls 102c.

The slave cylinder 112 comprises a third axial face 112a and a fourth axial face 112b connected by one or more second sidewalls 112c to define a slave cylinder chamber 113. The third axial face 112a has a second through-hole. The slave cylinder 112 is axially housed within the inner volume to move along an axis X between predefined end points or extremities defined by end stops E1, E2 which can for example be defined by abutment formations or lockup valves within the outer cylinder 102. The venting port 108 is sufficiently open throughout movement of the slave cylinder 112 to provide pressure equalization between the gas chamber 109 and atmosphere.

The outer cylinder 102 includes a hydraulic fluid port 106 on the opposite side of the slave cylinder 112 to the venting port 108. The hydraulic fluid port 106 can be used to introduce hydraulic fluid into the primary chamber 104. The hydraulic fluid port 106 is sufficiently open throughout movement of the slave cylinder 112 to enable fluid to be supplied to the primary chamber 104.

A first dynamic seal 117 is provided between the slave cylinder 112 and outer cylinder 102 to inhibit hydraulic fluid passing to the gas side 108. The seal can be mounted on a gland nut arranged to be screwed into the aperture in the axial face of the outer cylinder 102. A plurality of first dynamic seals can be provided in parallel with one another.

The slave cylinder 112 defines a slave cylinder chamber 113 within which a piston and rod assembly 120, 122 is axially housed to move along the axis X. The piston 122 is linearly transposed within the slave cylinder chamber 113 and is free to move along it. The piston rod 120 extends through the second and first through-holes so as to project from the outer cylinder 102. The free end of the piston rod 120 defines the second connector 124.

A second dynamic seal 121 is provided between the piston rod 120 and outer cylinder 102 within the aperture formed through the axial face of the outer cylinder 102, to inhibit hydraulic fluid from passing out of the outer cylinder 102 via the aperture. A plurality of second dynamic seals can be provided in parallel with one another.

The slave cylinder 112 includes one or more control apertures 115 arranged to enable fluid communication between the hydraulic fluid chamber 104 and the slave cylinder chamber 113.

The piston rod 120 includes a blind hole opening into the slave cylinder chamber 113. A floating piston 126 is linearly transposed within the blind hole to define a movable partition between a gas chamber G and the hydraulic fluid within the slave cylinder chamber 113. Gas such as nitrogen can be inserted into the gas chamber G via a port 127. The sidewall of the floating piston 126 which faces the bore defining inner surface of the piston rod 120 is provided with a dynamic seal 138 to inhibit passage of hydraulic fluid or gas across it in use.

The actuator 100 is self-contained in that it is not energized in use by an external supply. In use, stored energy in the compressed gas within the gas chamber G pressurizes the hydraulic fluid to force the slave cylinder 112 to an end stop adjacent to the venting port 108 and also forces the piston rod 120 to extend outwardly with respect to the outer cylinder 102. Thus, the actuator 100 is continually biased to an intermediate condition between and distinct from the fully extended condition and the fully compressed condition, and therefore can act as both a positioner/trimmer and a shock absorber.

A dominant tensile force applied to the coupling regions 110, 124 results in the slave cylinder 112 being drawn away from the end stop adjacent to the venting port 108, against the spring force provided by the pressurized hydraulic fluid within the outer cylinder 102. Thus, the actuator 100 can be forced to move to a fully extended condition. Upon the applied tensile force becoming inferior to the biasing force provided by the hydraulic fluid, the actuator 100 moves towards and assumes the intermediate condition.

A dominant compressive force applied to the coupling regions 110, 124 results in the piston 122 of the piston rod 120 moving towards the piston 114 of the slave cylinder 112, against the spring force provided by the pressurized hydraulic fluid within the outer cylinder 113. Upon the applied compressive force becoming inferior to the biasing force provided by the hydraulic fluid, the actuator 100 moves towards and assumes the intermediate condition.

Figure 2:
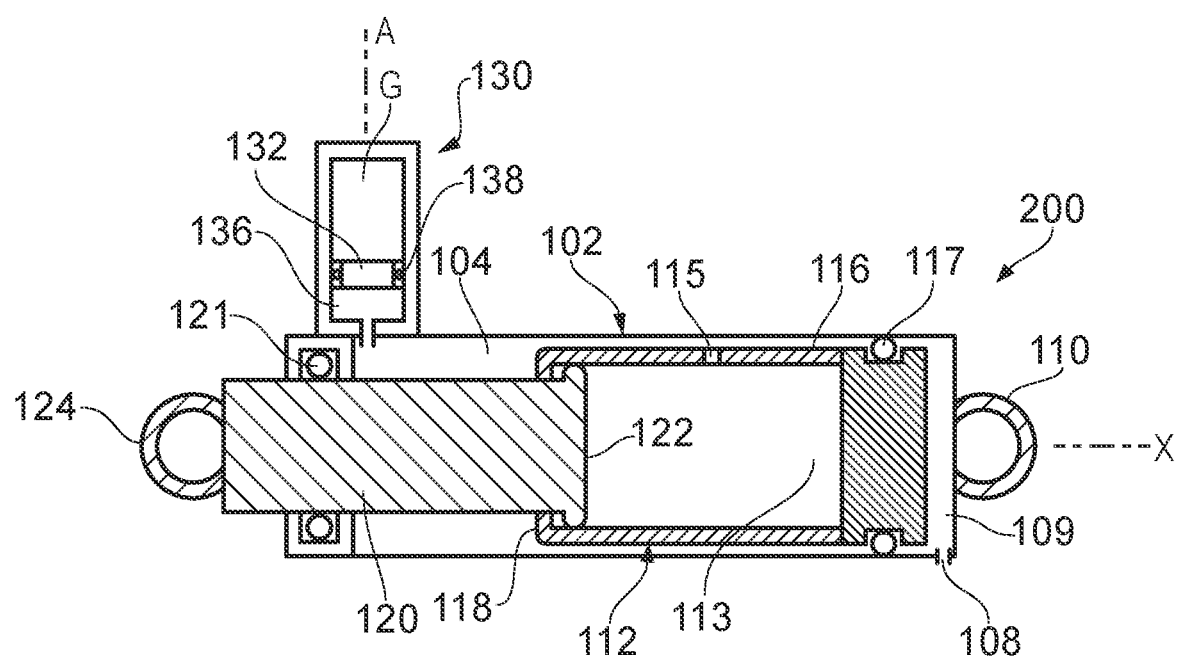
FIG. 2 is a diagram of a prior art actuator.

Referring additionally to FIG. 2, another type of center biased actuator 200 is shown in combination with an external gas containing accumulator cylinder 130 coupled to the port 106. The accumulator includes a floating piston 132 which partitions the accumulator cylinder 130 into a gas chamber 134 and a hydraulic fluid chamber 136. The sidewall of the floating piston 132 which faces the bore of the accumulator cylinder 130 is provided with a dynamic seal 138 to inhibit passage of hydraulic fluid or gas across it in use.

In either case, if hydraulic fluid leaks from the actuator 100, 200 across dynamic seals 117 or 121 in use then the gas in chamber G can force the floating piston 126, 132 to move towards the hydraulic fluid chamber 133, 136 to take up any slack in the system.

The present inventor has identified that leakage of hydraulic fluid or gas across the floating piston dynamic seal 138 can increase the likelihood of a loss of bias force towards the intermediate condition, thereby increasing the level of preventative maintenance required. In the context of an aircraft landing gear pitch trimmer, a loss of bias force towards the intermediate condition can result in an aborted take-off due to an inability to orientate the bogie beam for stowage, particularly when in cold conditions.

The present inventor has also identified that leakage of hydraulic fluid or gas across the floating piston dynamic seal 138 can make monitoring of the actuator 100 relatively complex because it can be necessary to track the position of the floating piston 132.

Figure 3:
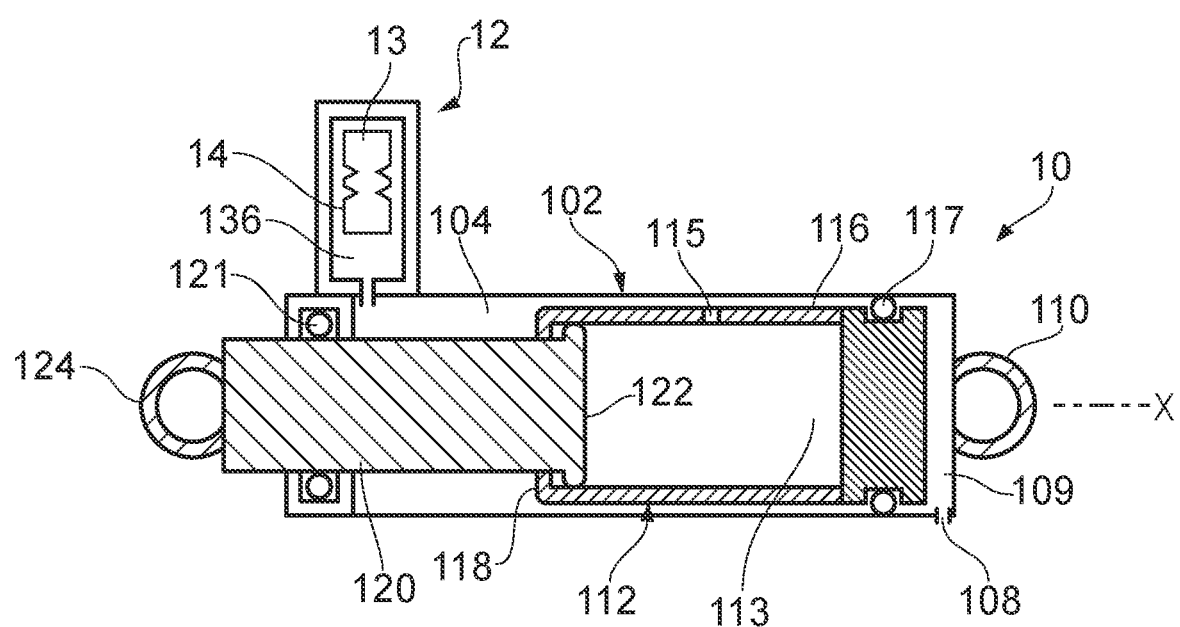
FIG. 3 is a diagram of an actuator according to an embodiment of the invention.

FIG. 3 shows an actuator 10 according to an embodiment of the present invention. The actuator 10 is similar to the known actuator 100 and therefore, for brevity, the following description will focus on the differences between the actuator 10 and the known actuator 100. Like parts have been give the same reference numerals. For clarity purposes, the end stops E1 and E2 are not shown.

The actuator 10 differs from the actuators 100, 200 in that it is coupled to an accumulator cylinder 12 in which the variable volume gas chamber 13 is defined by a sealed expandable chamber 14 containing gas such as nitrogen or helium. Thus, the expandable chamber 14 defines a variable volume chamber which enables the gas to take up slack in the system while inhibiting gas within it leaking into the hydraulic fluid chamber 136 and also inhibiting hydraulic fluid from the hydraulic fluid chamber 136 entering the gas chamber 13. The gas can compress and expand with the expandable chamber 14 to permit the actuator 10 to be compressed and extended.

Figure 4:
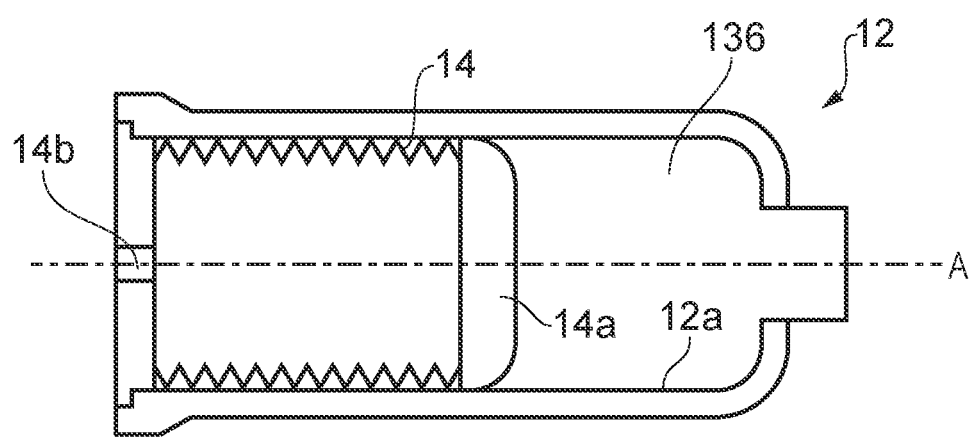
FIG. 4 is a diagram showing the accumulator cylinder including metal bellows of the actuator of FIG. 3.

The expandable chamber 14 can take various forms. In one example the expandable chamber 14 can comprise metal bellows 14 as shown in FIG. 4, to which reference should additionally be made, arranged to extend and contract along the bore axis A of the accumulator cylinder 12. The metal bellows 14 can be generally cylindrical in form with one or more radially inwardly or outwardly facing 'V' shaped regions that can open to permit extension of the bellows 14 and close to permit compression of the bellows 14. The axial end 14a of the bellows 14 that moves in use is guided along a housing wall, such as an inner side wall 12a of the accumulator cylinder 12. The axial end 14a contacts hydraulic fluid within the hydraulic fluid chamber 136 to centrally bias the actuator 10. The metal bellows 14 can be formed or welded. Gas can be inserted via a port 14b. The metal bellows 14 can be charged with gasses such as nitrogen helium and/or mixtures. The present inventor has found that metal bellows can provide a particularly reliable expandable chamber 14 for a self-contained center biased actuator such as an aircraft landing gear pitch trimmer. Metal bellows can be 'sealed for life' in that once they have been charged with gas they do not need to be re-charged for the lifespan of the product. Metal bellows can be bought as stand-alone units from various suppliers.

In other examples, the expandable chamber can be a bladder type accumulator or piston accumulator.

Knowing the internal volume of the hydraulic chamber for a given center biased actuator, the skilled person will be able to select an appropriate volume and configuration for the expandable chamber.

Figure 5:
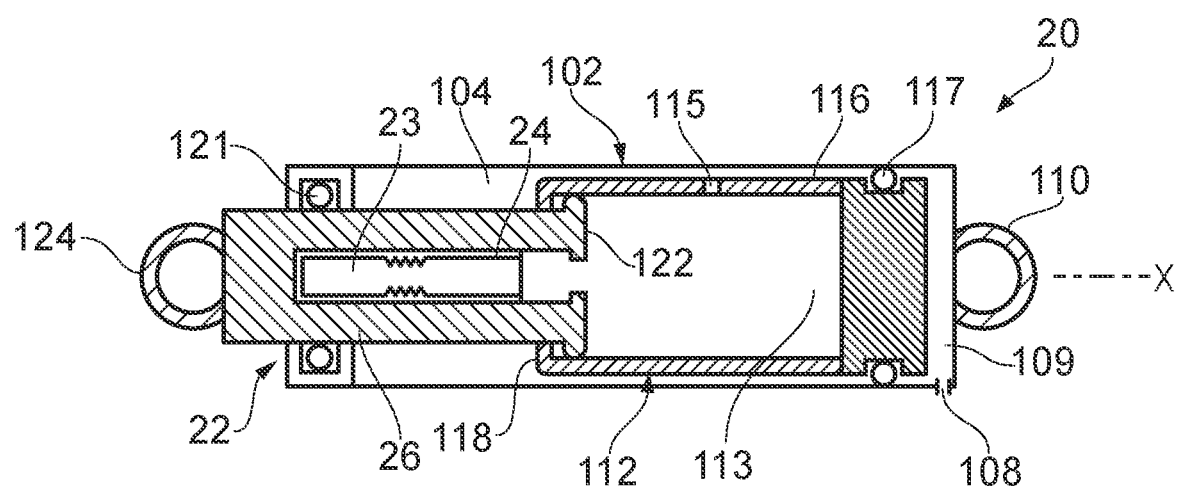
FIG. 5 is a diagram of an actuator according to a further embodiment of the invention.

FIG. 5 shows an actuator 20 according to a further embodiment of the present invention. The actuator 20 is similar to the actuator 10 of FIG. 3 and therefore, for brevity, the following description will focus on the differences between the actuator 20 and the actuator 10.

The piston rod 26 includes a blind hole containing an expandable chamber 24 that defines the gas chamber 23 and therefore the accumulator 22. The expandable chamber 24 can be the same as expandable chamber 14 of FIG. 3. Gas, such as nitrogen, within the gas chamber 23 forces the hydraulic fluid within the slave cylinder chamber 113 to bias the actuator 20 to its central position in a conventional manner. The gas can be compressed and expanded to permit the actuator to be compressed and expanded.

While the actuators of FIGS. 3 and 5 are shown with the second dynamic seals 117 acting in sliding engagement with the bore defining face of the outer cylinder 102, in other embodiments the second dynamic seals 117 can be reversed so as to be mounted on the bore defining face of the outer cylinder 102 to be in sliding engagement with the outer sidewall of the slave cylinder 112. This can further simplify maintenance and/or monitoring and/or improve operational performance of the actuator by reducing the likelihood of hydraulic fluid leaking past the second dynamic seals 117.

Figure 6:
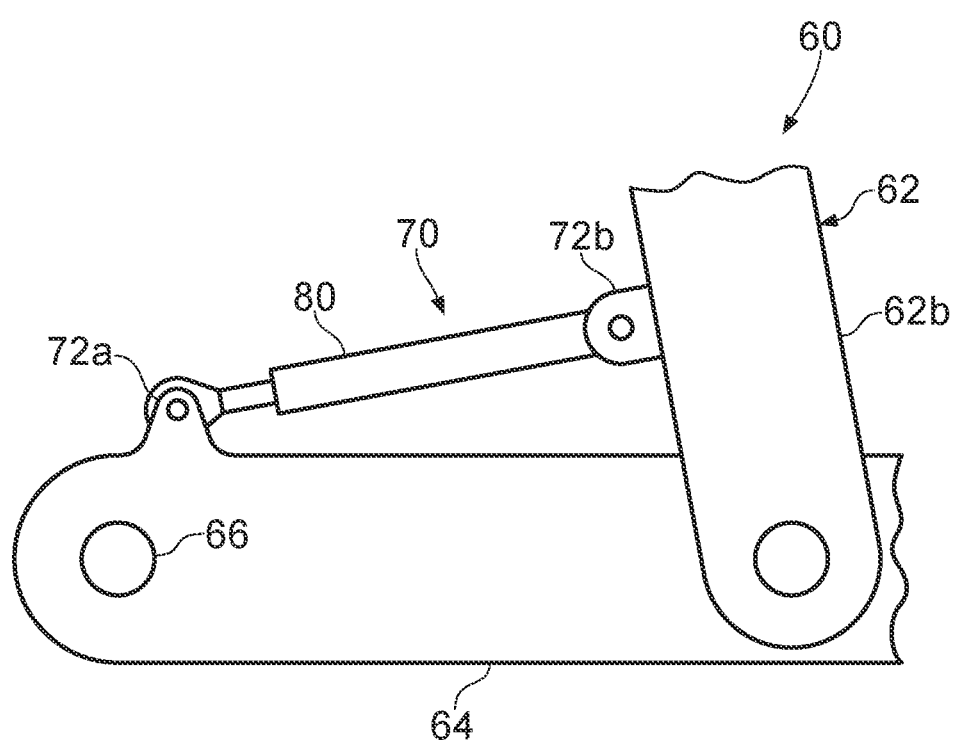
FIG. 6 is a diagram of an aircraft landing gear assembly according to an embodiment of the invention.

FIG. 6 shows a landing gear assembly 60 according to an embodiment of the present invention. The landing gear 60 includes a main strut 62, having an upper portion (not shown) arranged to be coupled to the underside of an aircraft (not shown) and a lower portion 62b telescopically mounted with respect to the upper portion. A bogie beam 64 is pivotally coupled to the lower portion of the main strut 62b, the bogie beam 64 having axles 66 mounted on it for carrying one or more wheel assemblies (not shown). A landing gear assembly according to embodiments of the present invention may have any suitable number of axles and wheels per axle.

A linkage 70 is pivotally coupled to the bogie beam 64 at a first coupling region 72a and pivotally coupled to the lower strut portion 62b at a second coupling region 72b. In the illustrated embodiment the linkage is defined by an actuator 80 according to an embodiment of the present invention, such as those described with reference to FIGS. 2 to 5. As will be appreciated, pivotal movement of the bogie beam 64 relative to the strut 62 results in a change in the condition i.e. the effective length of the actuator 80. The term "effective length" may refer to the distance between the pivot axis of first and second coupling regions 72a, 72b. Equally, a change in the effective length of the actuator 80 results in pivotal movement of the bogie beam 64 relative to the strut 62 and the actuator 80 can thus be used to "trim" the position of the bogie beam 64 for stowing. In alternative embodiments the coupling regions 72a, 72b could be reversed and may in other embodiments be coupled between any part of the bogie on the one hand and any part of the strut 62 on the other hand. In some embodiments the linkage 80 may include a multi bar linkage that is movable by an actuator so as to change the angular position of the bogie relative to the strut.

While the actuator 80 is described with reference to a landing gear assembly pitch trimming actuator, an assembly according to embodiments of the present invention may be any assembly including a center biased actuator according to an embodiment of the invention arranged to bias a first part of the assembly to assume a predetermined position relative to the second part, the assembly being arranged, in use, to force the actuator to assume the first condition when in a first state and having a second state in which the actuator moves the first part of the assembly to assume the predetermined position relative to the second part. The invention is particularly advantageous in assemblies where maintenance can be difficult and/or expensive; for example, flaps or slats in an aircraft wing, an oil rig boom, or a vehicle suspension system.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A center biased actuator comprising:
   an outer cylinder;
   a slave cylinder arranged to be linearly transposed within the outer cylinder;
   a rod assembly having a piston arranged to be linearly transposed within the slave cylinder and a rod extending from the outer cylinder;
   one or more first dynamic seals arranged to act on a sidewall of the rod to inhibit hydraulic fluid leaking from the outer cylinder;
   one or more second dynamic seals arranged to act on a sidewall of the slave cylinder or an inner surface of the outer cylinder to inhibit hydraulic fluid leaking from the outer cylinder;
   a gas chamber comprising a sealed expandable chamber containing gas, the expandable chamber being arranged to act on hydraulic fluid within the center biased actuator to bias the center biased actuator to assume an intermediate condition which lies between a compressed condition and an extended condition; and
   wherein the expandable chamber comprises an elastic vessel, a metal bellows or a bladder.

2. The center biased actuator according to claim 1, wherein the expandable chamber is mounted within an accumulator cylinder that is coupled to a hydraulic fluid port through the outer cylinder.

3. The center biased actuator according to claim 1, wherein the rod assembly includes a blind hole which opens into and is in fluid communication with an internal chamber of the slave cylinder and wherein the expandable chamber is mounted within the blind hole.

4. The center biased actuator according to claim 1, comprising end stops arranged to define first and second movement extremities of the slave cylinder.

5. The center biased actuator according to claim 1, wherein the outer cylinder has a length and the one or more second dynamic seals are located closer to the middle of the outer cylinder than to either end of the outer cylinder.

6. The assembly according to claim 1, wherein the sealed expandable chamber contains gas at a pressure greater than atmospheric pressure.

7. An assembly including a center biased actuator according to claim 1 arranged to bias a first part of the assembly to assume a predetermined position relative to a second part of the assembly, the assembly being arranged, in use, to force the actuator to assume the first condition when in a first state and having a second state in which the actuator moves the first part of the assembly to assume the predetermined position relative to the second part.

8. The assembly according to claim 7 comprising an aircraft assembly.

9. The assembly according to claim 8 comprising an aircraft landing gear assembly.

10. The assembly according to claim 9, wherein the first part comprises a bogie beam and the second part comprises a main strut.

11. The center biased actuator according to claim 1, wherein the outer cylinder comprises a first axial face and a second axial face connected by one or more first sidewalls to define a primary chamber, the first axial face having a first through-hole.

12. The center biased actuator according to claim 11, wherein the slave cylinder is arranged to be linearly transposed within the primary chamber, the slave cylinder comprising a third axial face and a fourth axial face connected by one or more second sidewalls to define a slave cylinder chamber, the third axial face having a second through-hole, the slave cylinder being constrained to move only between first and second extremities within the primary chamber so as to leave at least one free portion of the primary chamber, the outer cylinder including a venting port in fluid communication with the free portion of the primary chamber.

13. The center biased actuator according to claim 12, wherein the piston is arranged to be linearly transposed within the slave cylinder chamber and the rod is extendable though the second and first through-holes so as to project a free end of the rod from the outer cylinder.

14. The center biased actuator according to claim 13, wherein the one or more first dynamic seals are mounted at or adjacent to the first through hole and arranged to act on an external surface of the rod to inhibit working fluid within the chamber passing through the first through-hole.

15. The center biased actuator according to claim 13, wherein the one or more second dynamic seals are mounted on the one or more first sidewalls of the outer cylinder and are arranged to act on an external surface of the one or more second sidewalls of the slave cylinder to inhibit working fluid within the chamber passing to the free portion of the primary chamber.

16. An aircraft landing gear assembly including a center biased actuator arranged to bias a first part of the assembly to assume a predetermined position relative to the second part a second part of the assembly, the assembly being arranged, in use, to force the actuator to assume the first condition when in a first state and having a second state in which the actuator moves the first part of the assembly to assume the predetermined position relative to the second part, wherein the first part comprises a bogie beam and the second part comprises a main strut, the center biased actuator comprising:
an outer cylinder;
a slave cylinder arranged to be linearly transposed within the outer cylinder;
a rod assembly having a piston arranged to be linearly transposed within the slave cylinder and a rod extending from the outer cylinder;
one or more first dynamic seals arranged to act on a sidewall of the rod to inhibit hydraulic fluid leaking from the outer cylinder;
one or more second dynamic seals arranged to act on a sidewall of the slave cylinder or an inner surface of the outer cylinder to inhibit hydraulic fluid leaking from the outer cylinder; and
a gas chamber comprising a sealed expandable chamber containing gas, the expandable chamber being arranged to act on hydraulic fluid within the center biased actuator to bias the center biased actuator to assume an intermediate condition which lies between a compressed condition and an extended condition, wherein the expandable chamber comprises an elastic vessel, a metal bellows, or a bladder.

17. A center biased actuator comprising:
an outer cylinder;
a slave cylinder arranged to be linearly transposed within the outer cylinder;
a rod assembly having a piston arranged to be linearly transposed within the slave cylinder and a rod extending from the outer cylinder;
one or more first dynamic seals arranged to act on a sidewall of the rod to inhibit hydraulic fluid leaking from the outer cylinder;
one or more second dynamic seals arranged to act on a sidewall of the slave cylinder or an inner surface of the outer cylinder to inhibit hydraulic fluid leaking from the outer cylinder;
a gas chamber comprising an unvented expandable chamber containing gas, the expandable chamber being arranged to act on hydraulic fluid within the center biased actuator to bias the center biased actuator to assume an intermediate condition which lies between a compressed condition and an extended condition; and
wherein the expandable chamber comprises an elastic vessel, a metal bellows or a bladder.

* * * * *